United States Patent
James et al.

(10) Patent No.: US 10,215,322 B1
(45) Date of Patent: Feb. 26, 2019

(54) REMOVABLE OIL PIPELINE BRANCH PLUG

(71) Applicant: TALLGRASS MLP OPERATIONS, LLC, Leawood, KS (US)

(72) Inventors: Matthew W. James, San Antonio, TX (US); Amanda Kaiser, Dacono, CO (US)

(73) Assignee: TALLGRASS MLP OPERATIONS, LLC, Leawood, KS (US)

( * ) Notice: Subject to any disclaimer, the term of this patent is extended or adjusted under 35 U.S.C. 154(b) by 0 days.

(21) Appl. No.: 15/649,671

(22) Filed: Jul. 14, 2017

(51) Int. Cl.
*F16L 55/10* (2006.01)
*F16L 55/11* (2006.01)

(52) U.S. Cl.
CPC ....... *F16L 55/1141* (2013.01); *F16L 55/1108* (2013.01)

(58) Field of Classification Search
CPC .... F16L 55/132; F16L 55/136; F16L 55/1283
USPC ................................. 138/89, 90, 93
See application file for complete search history.

(56) References Cited

U.S. PATENT DOCUMENTS

| | | | |
|---|---|---|---|
| 2,475,748 A * | 7/1949 | Leroy | G01M 3/022 138/90 |
| 2,607,370 A * | 8/1952 | Anderson | F16L 55/136 138/90 |
| 2,652,894 A | 9/1953 | Brown et al. | |
| 2,974,685 A * | 3/1961 | Ver Nooy | F16L 55/136 138/90 |
| 3,506,067 A | 4/1970 | Lebourg | |
| 4,385,643 A * | 5/1983 | Noe | F16L 55/136 138/90 |
| 4,422,477 A * | 12/1983 | Wittman | F16L 55/1283 138/89 |
| 4,474,216 A * | 10/1984 | Noe | F16L 55/136 138/89 |
| 4,600,036 A * | 7/1986 | Noe | F16L 55/136 138/89 |
| 4,611,485 A * | 9/1986 | Leslie | F28F 11/02 138/90 |

(Continued)

FOREIGN PATENT DOCUMENTS

EP 0141726 9/1992

OTHER PUBLICATIONS

Willimczik; Solution to stop the oil well with a new smart pipe plug; http://www.wolfhartindustries.com/oilspill.htm; Jun. 1, 2010.

(Continued)

*Primary Examiner* — Patrick F Brinson
(74) *Attorney, Agent, or Firm* — Stinson Leonard Street LLP

(57) ABSTRACT

A pipeline plug having a seal assembly and a slip assembly coupled to the seal assembly. The slip assembly moves from a retracted position to an expanded position when the seal assembly moves from a disengaged position to an engaged position. The slip assembly frictionally engages the internal wall of a pipe when in the expanded position. The force exerted on the pipeline plug by fluid within the pipe increases the force by which the slip assembly engages the internal wall of the pipe. The plug is removable from the pipe without damaging the plug by moving the seal assembly back to the disengaged position. A method of sealing a pipeline using the pipeline plug.

17 Claims, 13 Drawing Sheets

(56) References Cited

U.S. PATENT DOCUMENTS

| | | | | |
|---|---|---|---|---|
| 4,760,868 | A | * | 8/1988 | Saxon .................. F16L 55/136 |
| | | | | 138/89 |
| 4,817,671 | A | * | 4/1989 | Mathison ............. F16L 55/132 |
| | | | | 138/89 |
| 4,967,468 | A | * | 11/1990 | Vossbrinck ........... B23P 19/025 |
| | | | | 138/89 |
| 5,086,852 | A | | 2/1992 | Van Buskirk |
| 5,797,431 | A | * | 8/1998 | Adams ................. F16L 55/136 |
| | | | | 138/89 |
| 6,769,491 | B2 | | 8/2004 | Zimmerman et al. |
| 6,899,173 | B2 | | 5/2005 | Harmon et al. |
| 8,267,177 | B1 | | 9/2012 | Vogel et al. |
| 8,333,219 | B2 | * | 12/2012 | Holstad ................ F16L 55/136 |
| | | | | 138/89 |
| 8,739,834 | B2 | | 6/2014 | German et al. |
| 9,359,861 | B2 | | 6/2016 | Burgos |
| 9,664,588 | B2 | * | 5/2017 | Kotlyar ................. G01M 3/022 |
| 9,823,155 | B2 | * | 11/2017 | Sarkissian ............. G01M 3/022 |
| 2005/0263200 | A1 | * | 12/2005 | Syse .................. F16L 55/1283 |
| | | | | 138/90 |
| 2006/0260687 | A1 | * | 11/2006 | Morrison ............. F16L 55/136 |
| | | | | 137/318 |

OTHER PUBLICATIONS

Mueller Co.; The Mueller® No-Blo® Line Stopping System; 1998; 4 pages; Form No. 11065-Rev. 10/06-5M-1; Mueller Co., USA.

Mueller Gas; D-5 and E-5 Drilling Machine; Operating Instructions Manual; Apr. 2016; 8 pages; Form 9335; Mueller Co., USA.

Mueller Gas; NO-BLO® Operations Using E-5™ or EH-5™ Drilling Machine; Operating Instructions Manual; Apr. 2016; 32 pages; Form 8545; Mueller Co., USA.

* cited by examiner

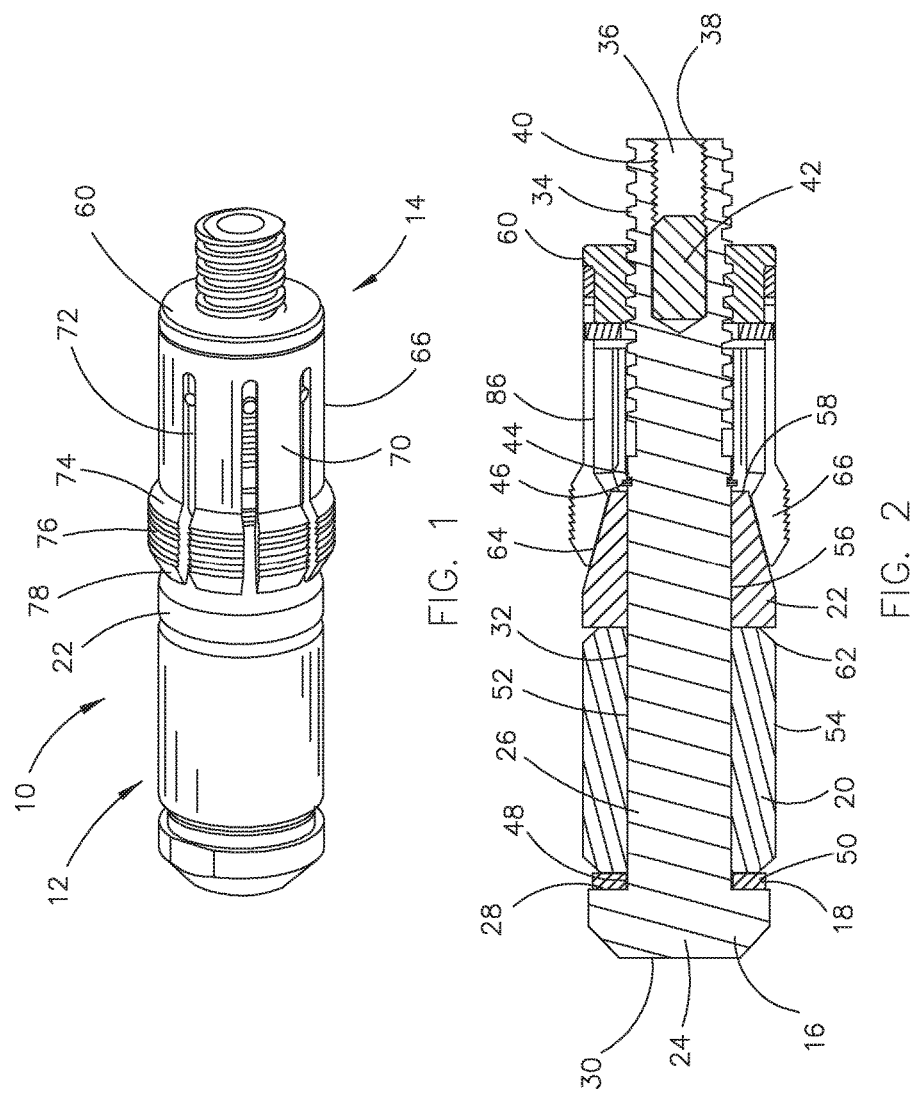

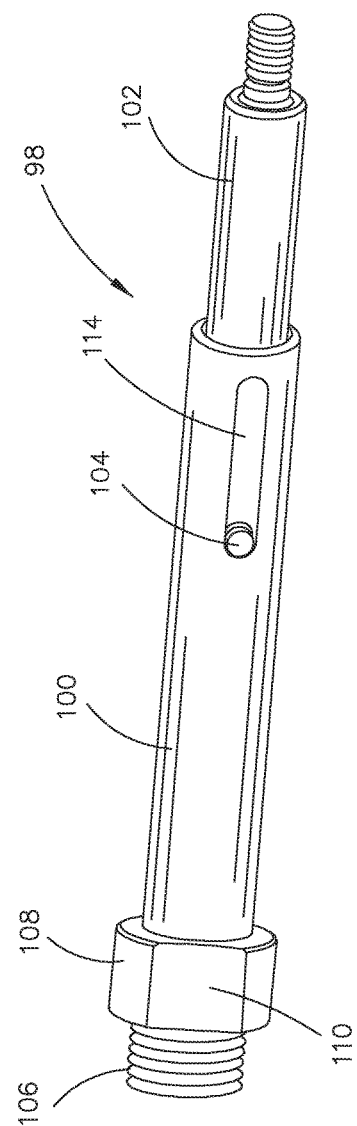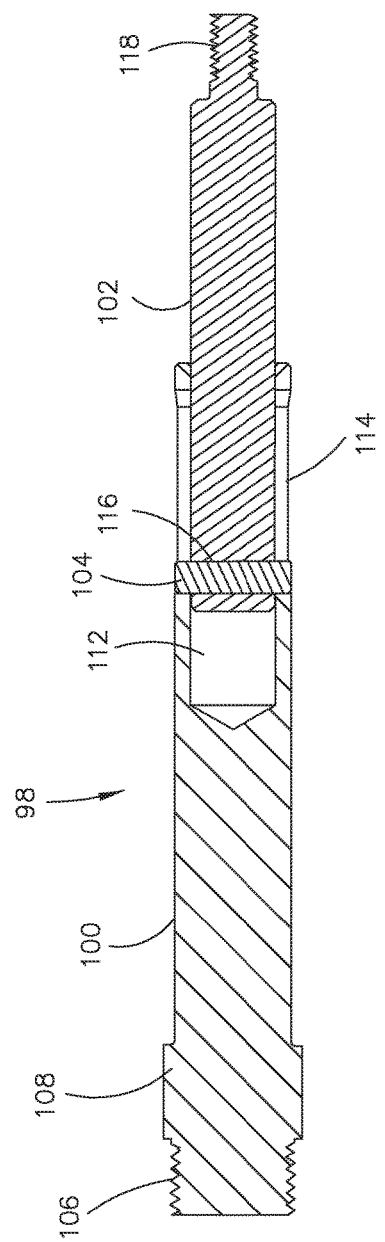
FIG. 6A
FIG. 6B

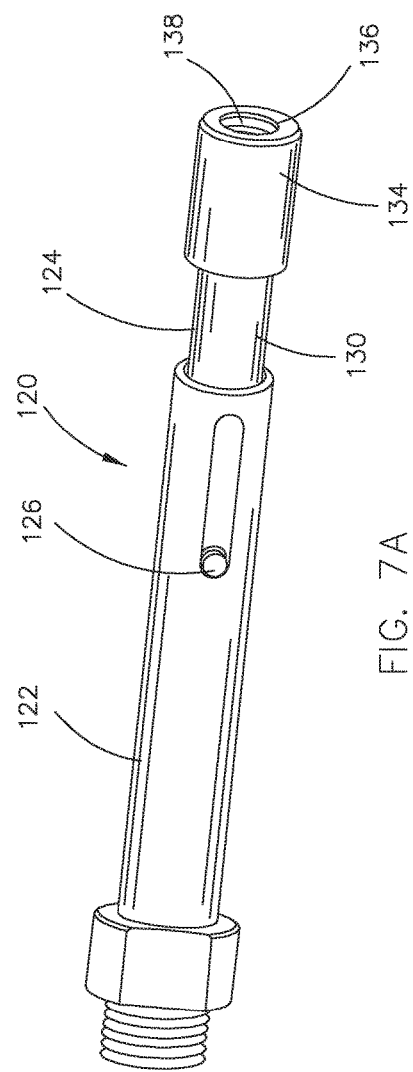
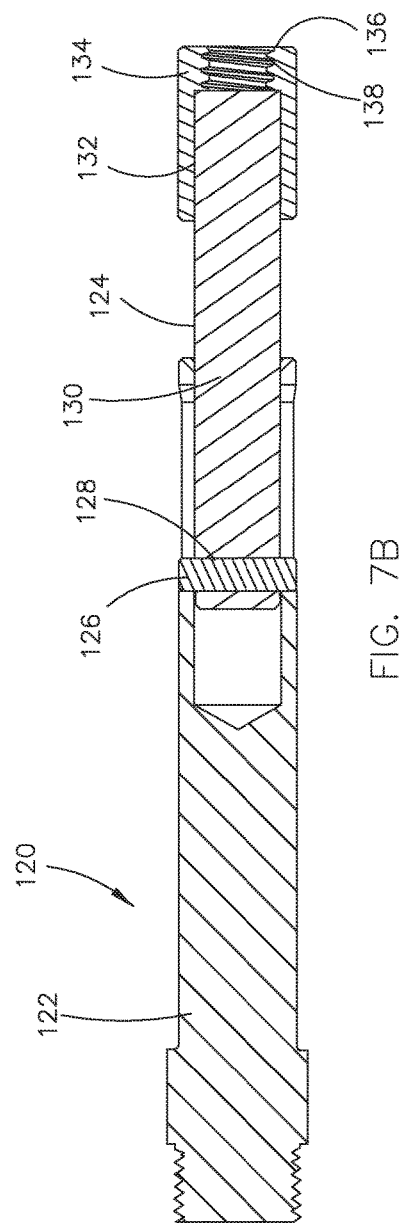
FIG. 7A
FIG. 7B

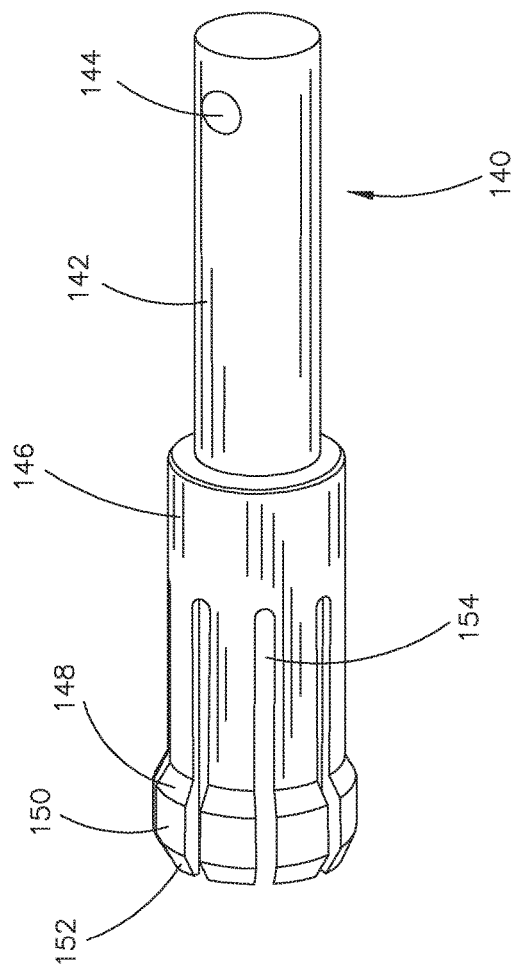

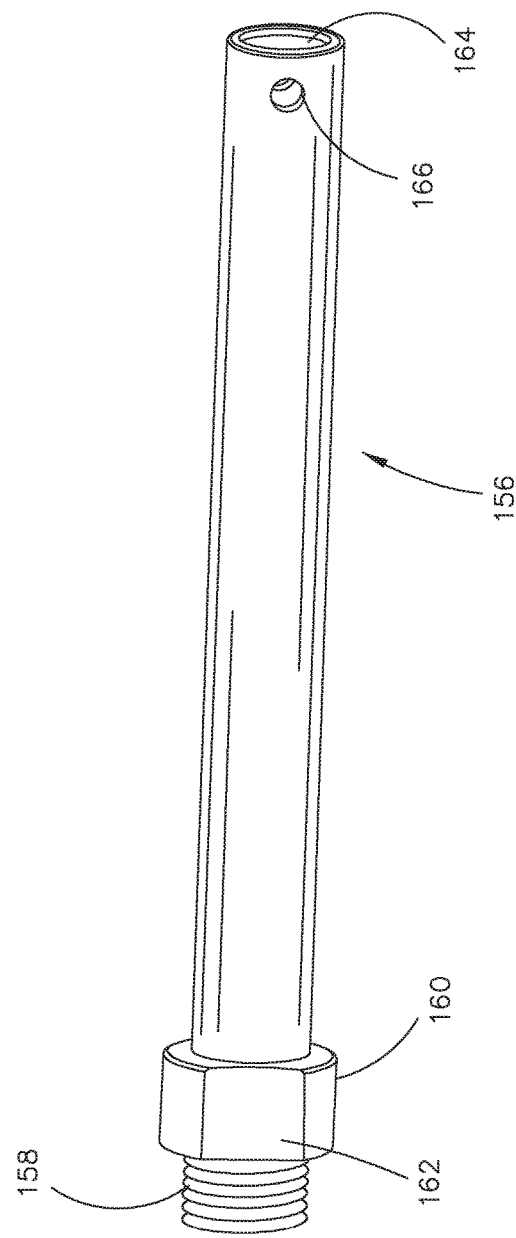

REMOVABLE OIL PIPELINE BRANCH PLUG

CROSS-REFERENCE TO RELATED APPLICATIONS

Not applicable.

STATEMENT REGARDING FEDERALLY SPONSORED RESEARCH OR DEVELOPMENT

Not applicable.

STATEMENT REGARDING JOINT RESEARCH AGREEMENT

The invention claimed herein was made by, or on behalf of, the parties to, and as a result of activities undertaken within the scope of, a "joint research agreement," as defined in 35 U.S.C. § 100, by and between Tallgrass Pony Express Pipeline, LLC and Southwest Research Institute that was in effect on or before the effective filing date of the claimed invention.

BACKGROUND OF THE INVENTION

1. Field of the Invention

The invention relates to systems and methods for temporarily blocking the flow of gas or fluid within a pipe, and in particular, to a removable pipeline plug and method for using the same.

2. Description of Related Art

Pipelines are conventionally used to transmit gas or fluid. At times, it is desirable to temporarily block the flow of fluid or gas within a pipeline. For instance, when a component of a pipeline, such as a valve, needs to be repaired or replaced, the flow of gas or fluid within the valve must be stopped prior to removal of the valve for repair or replacement.

A variety of different plugs are known for stopping flow through a pipeline. One type of plug includes an inflatable bag that is inserted into the pipeline in a deflated state and is then inflated to sealingly engage the internal walls of the pipe. While inflatable plugs are often effective for low pressure gas pipeline applications, they are generally not effective for higher pressure applications, which may cause the plug to be pushed through the pipe. Further, they are prone to ripping or tearing, and thus generally cannot be relied upon for a wide range of applications.

Another known method for plugging a pipe involves inserting a cylindrical plug through an access hole that is drilled through the side of the pipe. A fitting may be welded or attached to the outside of the pipe to position and retain the plug. While these types of plugs are generally suitable for their intended purpose, they require drilling a hole in the side of the pipe, which must be sealed with a fitting when the plug is removed. They are not suitable for axial insertion through a hole in the end of the pipe.

There are also a variety of packer tools that include seals to isolate zones of an oil or gas well. The packer tools are inserted axially through the pipe, but are typically relatively complex and are set in place by applying downward force on one portion of the packer tool, while the another portion of the tool is pulled upward. Many packer tools are also not removable from the wellbore without permanently damaging the tool by, for example, drilling through it.

BRIEF SUMMARY OF THE INVENTION

A pipeline plug in accordance with one embodiment of the invention described herein includes a seal assembly and a slip assembly coupled to the seal assembly. The seal assembly has a pressure engaging surface and a slip engaging surface. The seal assembly is movable with respect to the slip assembly between an engaged position and a disengaged position. The slip assembly has an outer surface that is movable from a retracted position to an expanded position. The outer surface is in the retracted position when the seal assembly is in the disengaged position. The slip engaging surface moves the outer surface to the expanded position when the seal assembly moves from the disengaged position to the engaged position. A force exerted on the pressure engaging surface causes the slip engaging surface to exert a force on the slip assembly that opposes movement of the outer surface from the expanded position to the retracted position. When a force is exerted on the pressure engaging surface the seal assembly is movable from the engaged position to the disengaged position and the outer surface is movable from the expanded position to the retracted position. The pipeline plug is preferably adapted to be positioned within a pipe and sealingly engage an internal wall of the pipe to prevent fluid from flowing past the pipeline plug. When the seal assembly is in the disengaged position and the slip assembly is in the retracted position, the pipeline plug may preferably slide into a pipe through an opening in the end of the pipe. When the seal assembly moves to the engaged position, it preferably sealingly engages the internal wall of the pipe, and when the slip assembly moves to the expanded position, it preferably frictionally engages the internal wall of the pipe to prevent axial movement of the pipeline plug within the pipe. If pressure of fluid within the pipe and the force exerted by the fluid on the pressure engaging surface increases, the force by which the outer surface of the slip assembly frictionally engages the internal wall of the pipe also preferably increases.

In another embodiment, a pipeline plug includes a plug body with a head and a shaft coupled to the head. The head has a pressure engaging surface. The shaft has external threads and internal threads that are threaded in an opposite direction as the external threads. A set ring has internal threads that engage the external threads of the shaft. A plurality of slips are coupled to the set ring. A seal is positioned between the head and the plurality of slips, and a cone is positioned between the seal and the set ring. The cone has a slip engaging surface that engages the plurality of slips. Each of the plurality of slips, the seal, and the cone presents an opening that receives the shaft. Preferably, the plug body is rotated in a first direction to move it from a disengaged position to an engaged position, in which it may sealingly engage the internal wall of a pipe within which the pipeline plug is positioned. As the plug body moves to the engaged position preferably the slip engaging surface moves an outer surface of the plurality of slips from a retracted position to an expanded position, in which it may frictionally engage the internal wall of the pipe. The plug body preferably may be rotated in a second direction, opposite to the first direction, to move the plug body from the engaged position to the disengaged position and to move the plurality of slips to the retracted position so that the pipeline plug may be removed from the pipe.

The present application also encompasses a method of sealing a pipeline with a pipeline plug having a seal assembly with a pressure engaging surface and a slip engaging surface. The pipeline plug also has a slip assembly with an outer surface. The method includes sliding the pipeline plug into a pipe, and rotating at least a portion of the seal assembly in a first direction with respect to the slip assembly to move the seal assembly from a disengaged position to an engaged position. Movement of the seal assembly from the disengaged position to the engaged position causes the slip engaging surface to move the outer surface from a retracted position to an expanded position, in which the outer surface engages the pipe. Next, at least a portion of the seal assembly is rotated in a second direction that is opposite to the first direction with respect to the slip assembly to move the seal assembly from the engaged position to the disengaged position. Movement of the seal assembly from the engaged position to the disengaged position allows the outer surface to move from the expanded position to the retracted position. Finally, the pipeline plug slides out of the pipe.

The pipeline plugs set forth above may preferably be used to seal an oil pipeline branch for the replacement or repair of a valve connected to the oil pipeline branch. The pipeline plugs are preferably set in place within the oil pipeline branch using a conventional drilling machine and tools adapted for use with the drilling machine. When the pipeline plug is set in place, it holds back the fluid within the oil pipeline branch so that the valve may be repaired or replaced. After repair or replacement of the valve, the pipeline plug may be removed from the pipe without damaging the pipeline plug, the oil pipeline branch or the valve. Thus, the pipeline plug may be reused multiple times.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 1 is a perspective view of a pipeline plug in accordance with one embodiment of the invention described herein;

FIG. 2 is a side cross-sectional view of the pipeline plug of FIG. 1;

FIG. 6A is a perspective view of a set tool adapted to set the pipeline plug of FIG. 1 within a pipe;

FIG. 6B is a side cross-sectional view of the set tool of FIG. 6A;

FIG. 7A is a perspective view of a release tool adapted to release the pipeline plug of FIG. 1 from a pipe;

FIG. 7B is a side cross-sectional view of the release tool of FIG. 7A;

FIG. 8A is a perspective view of a spring reamer adapted to ream a pipe prior to setting of the pipeline plug of FIG. 1 within the pipe;

FIG. 8B is a perspective view of a reamer adapter for use with the spring reamer of FIG. 8A;

DETAILED DESCRIPTION OF PREFERRED EMBODIMENT

Figure 3:
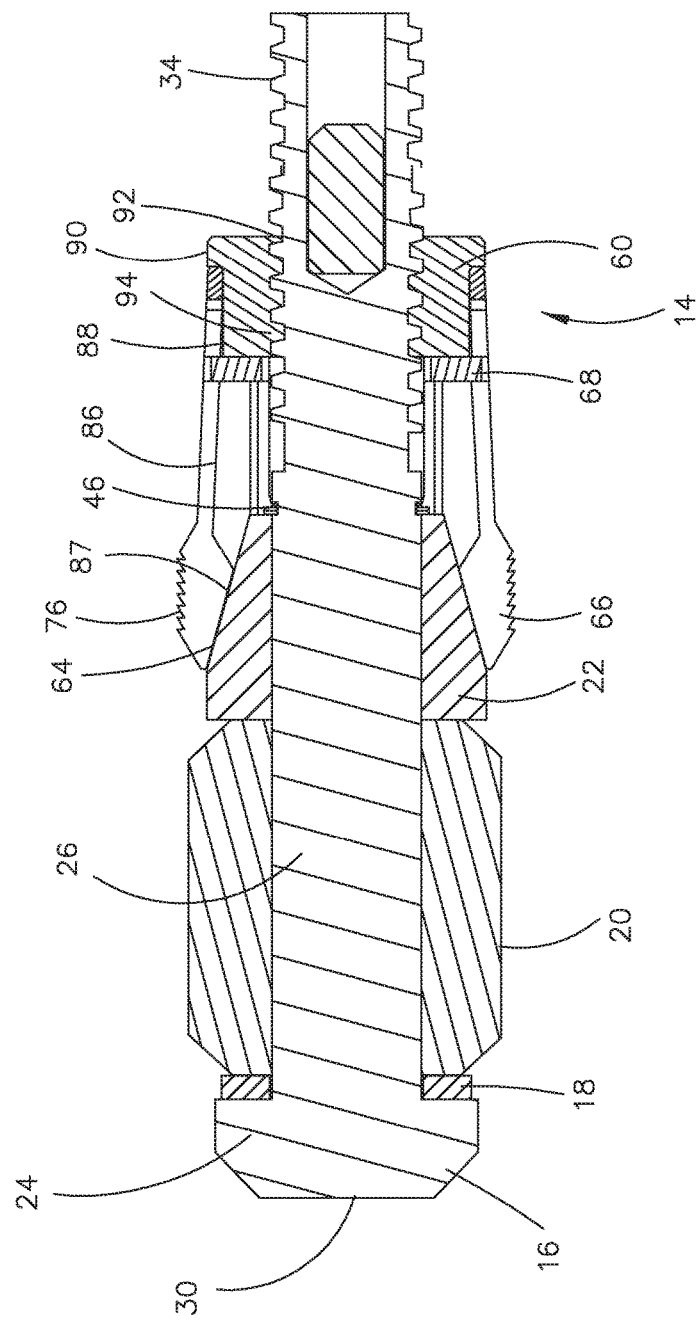
FIG. 3 is a side cross-sectional view of the pipeline plug of FIG. 1 showing a seal assembly in an engaged position and a slip assembly in an extended position.

A pipeline plug in accordance with one embodiment of the invention described herein is identified generally as 10 in FIG. 1. Pipeline plug 10 includes a seal assembly 12 and a slip assembly 14 that is coupled to the seal assembly 12. As described in detail below, the pipeline plug 10 may be used to plug an oil pipeline branch to facilitate the replacement or repair of a valve on the oil pipeline branch. Pipeline plug 10 may also be used to plug pipes for other purposes. The pipeline plug 10 is set in place by sliding it through the oil pipeline branch and valve. The seal assembly 12 is then moved in one direction relative to the slip assembly 14, which expands the seal assembly 12 causing it to sealingly engage the internal wall of the oil pipeline branch and which expands the slip assembly 14 causing it to engage the internal wall of the oil pipeline branch. The pipeline plug 10 holds back fluid within the oil pipeline branch as the valve is repaired or replaced. The force exerted on the pipeline plug 10 by the pressurized fluid within the oil pipeline branch causes the seal assembly 12 to exert a force on the slip assembly 14 that resists contraction of the slip assembly 14. After the valve is repaired or replaced, the seal assembly 12 may then be moved in the opposite direction relative to the slip assembly 14 to contract the seal assembly 12 and slip assembly 14 allowing the pipeline plug 10 to slide back out of the oil pipeline branch and valve. The pipeline plug 10 is not damaged during usage so that it may be reused after it slides out of the oil pipeline branch and valve.

Referring to FIG. 2, seal assembly 12 includes a plug body 16, a washer 18, a seal 20, and a cone 22. Plug body 16 is generally shaped like a bolt with a head 24 and a shaft 26 that is coupled to head 24. Head 24 has an outer diameter that is greater than the outer diameter of shaft 26 to form an abutment surface 28. Head 24 has a pressure engaging surface 30 that is exposed to the pressurized fluid within a pipe when pipeline plug 10 is deployed. Shaft 26 includes an outer surface 32, a portion of which has external threads 34 formed therein. External threads 34 extend from the opposite end of plug body 16 as the end with head 24 toward head 24 about one third of the length of shaft 26.

Shaft 26 includes a cylindrical recess 36 that extends into shaft 26 from the opposite end of plug body 16 as the end with head 24. Cylindrical recess 36 extends into shaft 26 a distance that is approximately one half of the length of external threads 34. An internal surface 38 surrounds cylindrical recess 36. Internal surface 38 includes internal threads 40. Internal threads 40 are threaded in an opposite direction as the external threads 34. Internal threads 40 may be left hand threaded and external threads 34 may be right hand threaded, or internal threads 40 may be right hand threaded and external threads 34 may be left hand threaded.

A pin 42 is positioned within cylindrical recess 36 and has a length that is approximately one half of the total length of cylindrical recess 36. An annular groove 44 is formed in the outer surface 32 of shaft 26. Annular groove 44 is positioned between external threads 34 and cone 22. A spiral retaining ring 46 is received by annular groove 44.

Washer 18 includes a central opening 48 that receives shaft 26. Washer 18 has a cylindrical outer surface 50 with a diameter that is approximately the same as the diameter of head 24. Washer 18 abuts the abutment surface 28 of head 24, and is positioned between head 24 and seal 20.

Seal 20 includes a central opening 52 that receives shaft 26. Seal 20 has a cylindrical outer surface 54 with a diameter when seal 20 is uncompressed, as shown in FIG. 2, that is slightly larger than the diameter of head 24. Seal 20 has a length that extends approximately one third of the length of shaft 26. Seal 20 is positioned between washer 18 and cone 22. Seal 20 is preferably formed from a fluoroelastomer material, such as 75 durometer fluoroelastomer material sold under the trademark VITON by The Chemours Company; however, it is within the scope of the invention for seal 20 to be formed from any suitable elastomer or other material.

Cone 22 includes a central opening 56 that receives shaft 26. Cone 22 includes a first end 58 that is positioned nearest to a set ring 60 of slip assembly 14 and a second end 62 that is positioned nearest to head 24. Cone 22 has a tapered outer surface 64 that increases in diameter from first end 58 to a location approximate second end 62 where the diameter is constant from there to second end 62. The diameter of tapered outer surface 64 at first end 58 is slightly larger than the diameter of shaft 26, and the diameter of tapered outer surface 64 near second end 62 is approximately the same as the diameter of seal 20 when uncompressed. Tapered outer surface 64 acts as a slip engaging surface that engages a plurality of slips 66 of slip assembly 14. Cone 22 is positioned around shaft 26 between seal 20 and spiral retaining ring 46.

To assemble seal assembly 12, washer 18, seal 20, and cone 22 are preferably received by and slide down shaft 26 before spiral retaining ring 46 is placed within annular groove 44 to retain washer 18, seal 20, and cone 22 on shaft 26.

Figure 5:
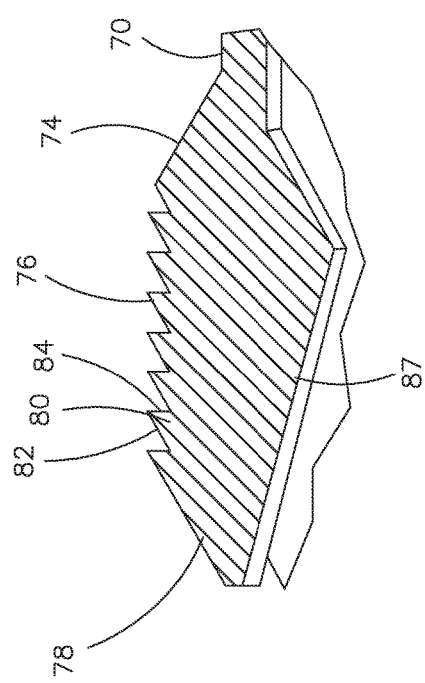
FIG. 5 is a detail view of a serrated outer surface of the slip assembly of the pipeline plug of FIG. 1.

Referring to FIG. 3, slip assembly 14 includes a plurality of slips 66 and set ring 60, which is coupled to the plurality of slips 66 with a plurality of pins, one of which is identified as 68. The plurality of slips 66 includes a cylindrical outer surface 70, shown in FIG. 1, within which is formed a plurality of grooves, one of which is identified as 72. The grooves 72 run lengthwise from an open end adjacent cone 22 to a closed end adjacent set ring 60. The diameter of cylindrical outer surface 70 is approximately the same as the diameter of seal 20 when uncompressed. Cylindrical outer surface 70 transitions to an inclined surface 74 that increases in diameter moving from cylindrical outer surface 70 toward cone 22. Inclined surface 74 transitions to a serrated outer surface 76, which transitions to an inclined surface 78 that decreases in diameter moving from serrated outer surface 76 towards cone 22. Referring to FIG. 5, serrated outer surface 76 includes a plurality of teeth, one of which is identified as 80, that each extend circumferentially around serrated outer surface 76. Tooth 80 includes an inclined surface 82 that increases in diameter moving from inclined surface 78 toward inclined surface 74. Tooth 80 includes a face 84 that extends from an edge of the tooth 80 at the end of inclined surface 82 to the beginning of the inclined surface of the next tooth in the serrated outer surface 76. The plurality of slips 66 includes an internal opening 86 (FIG. 3) that is larger than shaft 26 and that is received by shaft 26. Surrounding internal opening 86 near serrated outer surface 76, the plurality of slips 66 includes an internal inclined surface 87 that is adapted to abut and engage the tapered outer surface 64 of cone 22, as shown in FIG. 3.

Figure 4:
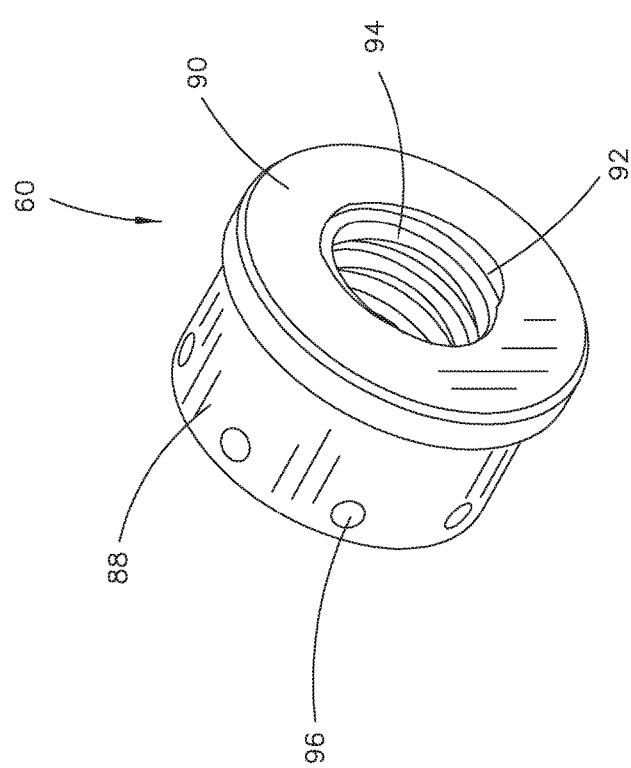
FIG. 4 is a perspective view of a set ring of the pipeline plug of FIG. 1.

Set ring 60, shown in FIG. 4, includes a cylindrical outer surface 88 with an outer diameter that is slightly smaller than the diameter of the internal opening 86 of the plurality of slips 66. Set ring 60 includes a flange 90 extending from the cylindrical outer surface 88. Flange 90 has an outer diameter that is approximately the same as the outer diameter of the plurality of slips 66. Set ring 60 includes an internal opening 92 that extends through the set ring 60. A cylindrical surface surrounding the internal opening 92 includes internal threads 94. Internal threads 94 are threaded in the same direction as the external threads 34 of plug body 16 and in the opposite direction as the internal threads 40 of plug body 16. Internal threads 94 and external threads 34 are preferably right hand threaded, while internal threads 40 of plug body 16 are preferably left hand threaded. Internal opening 92 receives shaft 26 and internal threads 94 engage the external threads 34 of plug body 16, as shown in FIG. 3.

Cylindrical outer surface 88 of set ring 60 includes a plurality of openings, one of which is identified as 96 in FIG. 4. The plurality of openings 96 in set ring 60 are spaced apart the same distance as the distance between the plurality of grooves 72 in the plurality of slips 66. Pins 68 (FIG. 3) are received by the plurality of grooves 72 and plurality of openings 96 to couple the plurality of slips 66 with set ring 60. Cylindrical outer surface 88 is positioned within the plurality of slips 66 and flange 90 abuts the end of the plurality of slips 66, as shown in FIG. 3.

Figure 9A:
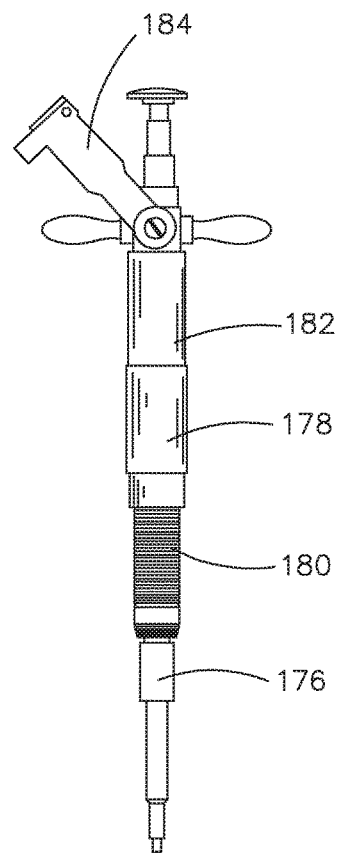
FIG. 9A is a side elevational view of a drilling machine adapted to set the pipeline plug of FIG. 1 within a pipe.
Figure 9B:
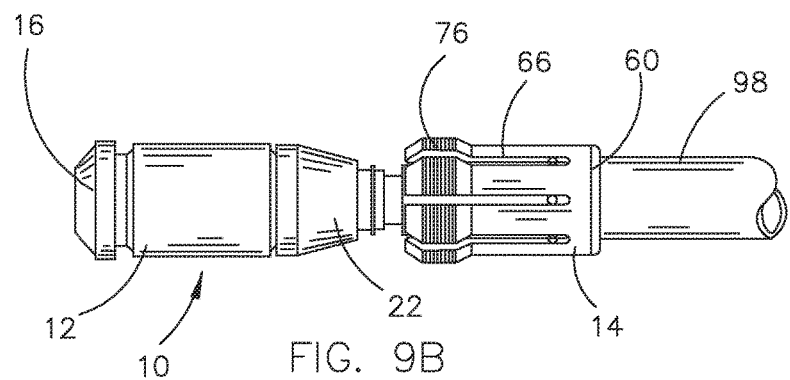
FIG. 9B is a side elevational view of the pipeline plug of FIG. 1 showing the seal assembly in a disengaged position and the slip assembly in a retracted position.

Seal assembly 12, including plug body 16, is movable with respect to slip assembly 14 between an engaged position, shown in FIG. 3, and a disengaged position, shown in FIG. 9B. Plug body 16 moves from the engaged position to the disengaged position by rotating the plug body 16 with respect to the set ring 60 in a first direction, which is clockwise when viewing pipeline plug 10 from the end of set ring 60 and when the internal threads 94 of set ring 60 and the external threads 34 of plug body 16 are right hand threaded. Plug body 16 moves from the disengaged position to the engaged position by rotating the plug body 16 with respect to the set ring 60 in a second direction that is opposite to the first direction. The second direction is counter-clockwise when viewing pipeline plug 10 from the end of set ring 60 and when the internal threads 94 of set ring 60 and the external threads 34 of plug body 16 are right hand threaded.

The serrated outer surface 76 of the plurality of slips 66 is movable between a retracted position, shown in FIG. 9B, and an expanded position, shown in FIG. 3. The serrated outer surface 76 is in the retracted position when plug body 16 is in the disengaged position. When plug body 16 moves from the disengaged position to the engaged position, the tapered outer surface 64 of cone 22 engages the internal inclined surface 87 of the plurality of slips 66. This engagement causes the serrated outer surface 76 of the plurality of slips 66 to move from the retracted position to the expanded position. In the retracted position and when a force is applied to the serrated outer surface 76 causing it to move inward toward shaft 26, the serrated outer surface 76 has an outer diameter that is approximately the same as the outer diameter of the head 24 of plug body 16. In the expanded position, the serrated outer surface 76 has a diameter that expands to be greater than the diameter of head 24 of plug body 16 enabling the serrated outer surface 76 to engage and grip the internal wall of a pipe within which pipeline plug 10 is positioned. The teeth of serrated outer surface 76, shown in FIG. 5, are configured to frictionally engage the internal wall of a pipe to prevent pipeline plug 10 from being moved axially within the pipe due to a force exerted on the pipeline plug 10 from the fluid within the pipe. Further, when plug body 16 is in the disengaged position, the outer diameter of seal 20 is slightly larger than the diameter of head 24. When plug body 16 is in the engaged position, the seal 20 is compressed between the washer 18 and cone 22, which causes the outer diameter of seal 20 to expand, as shown in FIG. 3, and be substantially greater than the diameter of head 24 so that the seal 20 sealingly engages the internal wall of a pipe within which pipeline plug 10 is positioned.

When the serrated outer surface 76 is in the retracted position, it preferably has an outer diameter that is slightly larger than the internal diameter of the pipe that pipeline plug 10 is designed to seal. For example, if pipeline plug 10 is designed for sealing a pipe having an internal diameter of 0.75 inches, serrated outer surface 76 may have an outer diameter of approximately 0.80 inches when in the retracted position. By having an outer diameter that is slightly larger than the internal diameter of the pipe, the plurality of slips 66 are slightly compressed inward when pipeline plug 10 is inserted axially through an opening in the end of the pipe. The plurality of grooves 72 allow the plurality of slips 66 to be compressed inward in this manner. When pipeline plug 10 is positioned within the pipe and the inner surface of the pipe compresses the plurality of slips 66 inward, the plurality of slips 66 exert a resultant force on the inner surface of the pipe. The plurality of slips 66 are designed so that this resultant force prevents rotation of the plurality of slips 66 within the pipe as the plug body 16 is rotated with respect to set ring 60 to move plug body 16 from its disengaged position to its engaged position.

When a force is exerted on the pressure engaging surface 30 (FIG. 3) of plug body 16, such as a force resulting from pipeline plug 10 holding back pressurized fluid within a pipe, the force is transferred through the head 24 of plug body 16, washer 18, seal 20, and cone 22. The force is then transferred from the tapered outer surface 64 of cone 22 to the internal inclined surface 87 of the plurality of slips 66. The force exerted on the internal inclined surface 87 is substantially perpendicular to the internal inclined surface 87 and thus opposes movement of the serrated outer surface 76 from the expanded position to the retracted position. The force also presses the serrated outer surface 76 into tighter frictional engagement with the internal wall of a pipe, which allows pipeline plug 10 to hold back fluid within the pipe at a greater pressure without pipeline plug 10 moving axially within the pipe. When a force is exerted on the pressure engaging surface 30, the plug body 16 is movable from the engaged position to the disengaged position to move the serrated outer surface 76 from the expanded position to the retracted position. As plug body 16 moves from the engaged position to the disengaged position, spiral retaining ring 46 engages the first end 58 of cone 22 to move the cone 22 away from the plurality of slips 66, which allows the serrated outer surface 76 to move from the expanded position to the retracted position. Thus, even when a force is exerted on pressure engaging surface 30, pipeline plug 10 is removable from a pipe by moving plug body 16 to the disengaged position.

Referring to FIGS. 6A and 6B, a set tool for use in setting pipeline plug 10 within a pipe is identified generally as 98. Set tool 98 includes an adapter 100 that is coupled to a plug engager 102 with a pin 104. Adapter 100 includes external threads 106 on one end that are preferably adapted for engagement by a drilling machine, such as the Mueller E-5 drilling machine sold by Mueller Co. Adapter 100 includes a head 108 with generally parallel tool engaging surfaces 110 that can be engaged by a wrench to join adapter 100 to a drilling machine. At the opposite end as external threads 106, adapter 100 includes an internal recess 112 that receives a portion of plug engager 102. Grooves 114 formed in an outer surface of adapter 100 extend into the internal recess 112. Plug engager 102 includes an opening 116 at one end that is aligned with the grooves 114. Pin 104 is received by the grooves 114 and opening 116 to couple adapter 100 to plug engager 102. At the opposite end of plug engager 102 as opening 116, plug engager 102 has a shaft with external threads 118. The external threads 118 of plug engager 102 are preferably sized for engagement with, and are threaded in the same direction as, the internal threads 40 of plug body 16. Preferably, the external threads 118 of plug engager 102 and the internal threads 40 of plug body 16 are left hand threaded. When the external threads 118 of set tool 98 are left hand threaded and engage the internal threads 40 of plug body 16, the set tool 98 is rotated in a counter-clockwise direction (when viewing pipeline plug 10 from the end of set ring 60) to move the set tool 98 inward toward pin 42. When set tool 98 engages pin 42, further rotation of set tool 98 in the counter-clockwise direction causes the plug body 16 to move from the disengaged position to the engaged position via the threaded engagement between the external threads 34 of plug body 16 and the internal threads 94 of set ring 60, each of which being right-hand threaded in this example.

A release tool for use in releasing pipeline plug 10 from engagement with a pipe is identified generally as 120 in FIGS. 7A and 7B. Release tool 120 includes an adapter 122 that is coupled to a plug engager 124 with a pin 126. Adapter 122 preferably has a similar configuration as the adapter 100 of set tool 98 described above. Thus, adapter 122 is not described in detail herein. Plug engager 124 includes one end with an opening 128 that receives pin 126 to couple plug engager 124 to adapter 122 in a similar manner as described above with respect to the coupling of adapter 100 and plug engager 102 of set tool 98. Plug engager 124 includes a shaft 130 that is partially received by the recess in adapter 122. An end of shaft 130 spaced apart from adapter 122 is received by a recess 132 in a removal tool collar 134. Removal tool collar 134 is preferably joined to shaft 130. An end of removal tool collar 134 opposite recess 132 includes an opening 136 that is surrounded by an internal surface with internal threads 138. Internal threads 138 of release tool 120 are preferably sized for engagement with, and are threaded in the same direction as, the external threads 34 of plug body 16. Preferably, the internal threads 138 of release tool 120 and the external threads 34 of plug body 16 are right hand threaded. When the internal threads 138 of release tool 120 are right hand threaded and engage the external threads 34 of plug body 16, the release tool 120 is rotated in a clockwise direction (when viewing pipeline plug 10 from the end of set ring 60) to move the release tool 120 inward toward set ring 60. When release tool 120 engages set ring 60, further rotation of release tool 120 in the clockwise direction causes the plug body 16 to move from the engaged position to the disengaged position via the threaded engagement between the external threads 34 of plug body 16 and the internal threads 94 of set ring 60.

Referring to FIG. 8A, a spring reamer for reaming the inner wall of a pipe prior to insertion of pipeline plug 10 is identified generally as 140. Spring reamer 140 includes shaft 142 with an opening 144. A cylinder 146 extends outward from the shaft 142, a first inclined surface 148 extends outward from the cylinder 146, a cylindrical surface 150 extends outward from the first inclined surface 148, and a second inclined surface 152 extends outward from the cylindrical surface 150. A plurality of grooves 154 are formed in the outer surfaces of the cylinder 146, first inclined surface 148, cylindrical surface 150, and second inclined surface 152. The grooves 154 extend from an end of the spring reamer 140 containing second inclined surface 152 toward shaft 142 and terminate prior to shaft 142. Cylinder 146, first inclined surface 148, cylindrical surface 150, and second inclined surface 152 surround a hollow interior. First inclined surface 148 increases in diameter moving from shaft 142 toward cylindrical surface 150, and second inclined surface 152 decreases in diameter moving from cylindrical surface 150 toward the end of spring reamer 140. The diameter of cylindrical surface 150 is preferably sized for reaming the inner diameter of a particular size of pipe.

FIG. 8B shows a reamer adapter 156 that couples to spring reamer 140 for joining the spring reamer 140 to a drilling machine. Reamer adapter 156 includes external threads 158 on one end that are preferably adapted for engagement by a drilling machine, such as the Mueller E-5 drilling machine sold by Mueller Co. Reamer adapter 156 includes a head 160 with generally parallel tool engaging surfaces 162 that can be engaged by a wrench to join reamer adapter 156 to a drilling machine. At the opposite end as external threads 158, reamer adapter 156 includes an internal recess 164 that receives a portion of spring reamer 140. An opening 166 in reamer adapter 156 receives a pin (not shown) that is also received by the opening 144 in spring reamer 140 to couple spring reamer 140 to reamer adapter 156.

Figure 9C:
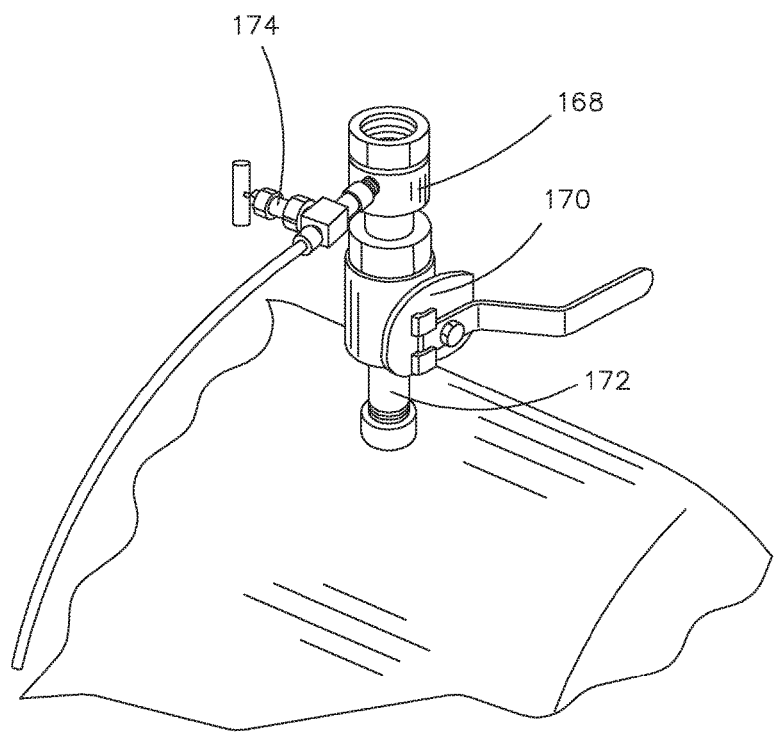
FIG. 9C is a perspective view of an oil pipeline branch with a valve and a drilling machine threaded adapter in threaded engagement with the oil pipeline branch.

In operation, prior to deployment of pipeline plug 10 within a pipe, the pipe is first configured so that a drilling machine may be used to advance and rotate the pipeline plug 10 within the pipe. If the pipe is a 0.75 inch or 1 inch oil pipeline branch, a Mueller E-5 drilling machine is preferably used to advance and rotate the pipeline plug 10 within the pipe. To prepare the pipe for use with the Mueller E-5 drilling machine, a Mueller threaded adapter 168 (FIG. 9C) is threaded into engagement with the pipe. FIG. 9C shows Mueller threaded adapter 168 threaded into engagement with the opening of a valve 170 that is threaded into engagement with an oil pipeline branch 172. A bleed valve 174 is joined to the Mueller threaded adapter 168.

Figure 9D:
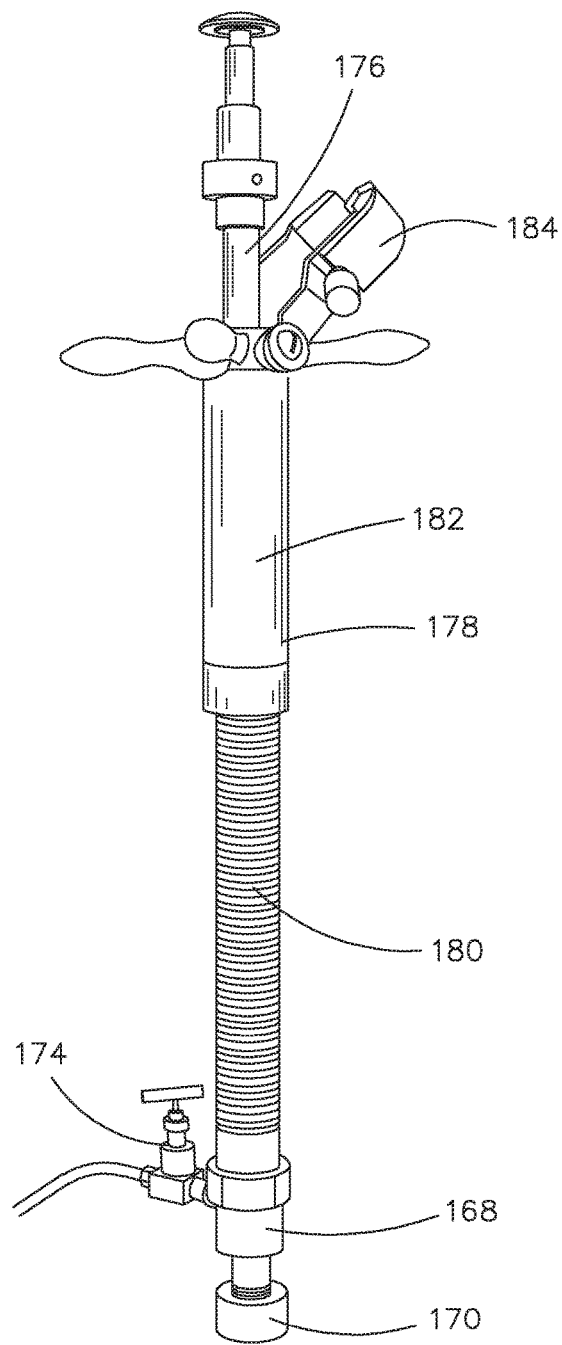
FIG. 9D is a perspective view of the drilling machine of FIG. 9A in threaded engagement with the threaded adapter and valve.
Figure 9E:
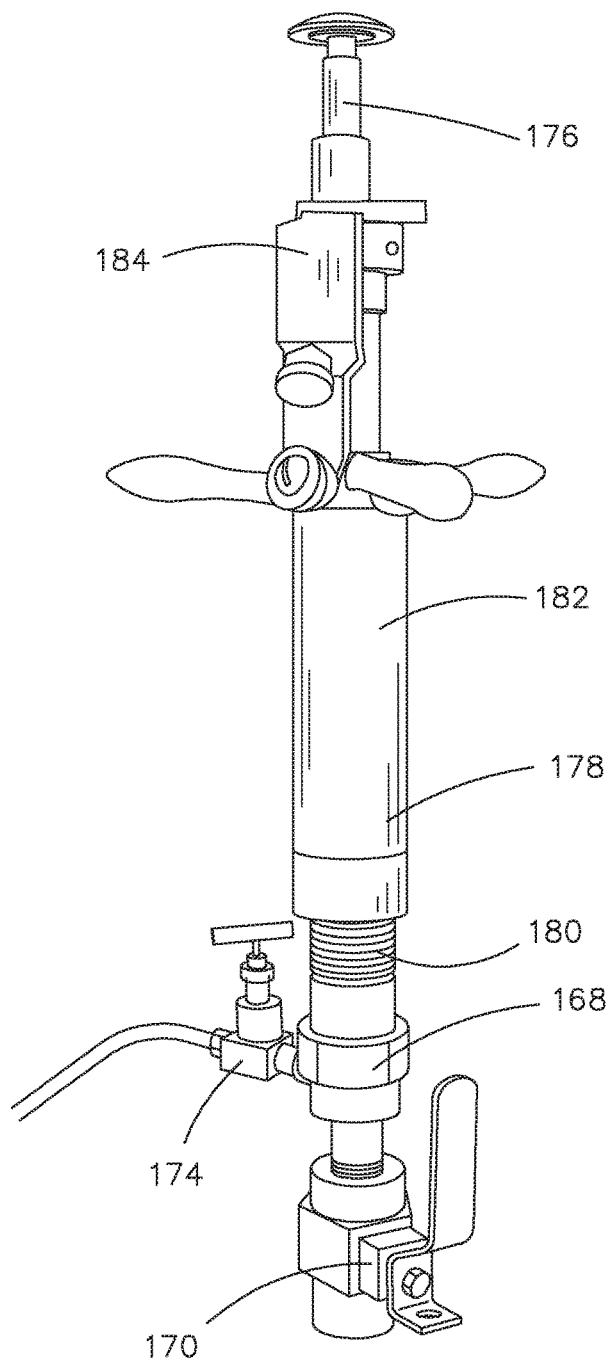
FIG. 9E is a perspective view of the drilling machine of FIG. 9E showing a boring bar of the drilling machine advanced through the valve.

Prior to setting of the pipeline plug 10, spring reamer 140 may be used to clear debris from within the oil pipeline branch 172 and prepare it to be plugged. Spring reamer 140 is joined to reamer adapter 156, and reamer adapter 156 is joined to the boring bar 176 (FIG. 9A) of a Mueller E-5 drilling machine 178 in a conventional fashion. The boring bar 176 and spring reamer 140 are retracted into the body 180 of the drilling machine 178 in a conventional manner, and the body 180 is threaded into engagement with the threaded adapter 168, as shown in FIG. 9D. The boring bar 176 and spring reamer 140 are then advanced into the oil pipeline branch 172 by coupling feed tube 182 and boring bar 176 of the drilling machine 178 with yoke 184, in the conventional manner as shown in FIG. 9E. Bleed valve 174 is closed and valve 170 is opened. Feed tube 182 is rotated to move it down body 180 and advance spring reamer 140 into oil pipeline branch 172. Boring bar 176 is simultaneously rotated at the top of the drilling machine 178 to rotate spring reamer 140 within the oil pipeline branch 172. Spring reamer 140 reams the interior surface of the oil pipeline branch 172 as spring reamer 140 is advanced into oil pipeline branch 172. When the spring reamer 140 has advanced through the oil pipeline branch 172, feed tube 182 is rotated in the opposite direction to back spring reamer 140 out of the oil pipeline branch 172 while continuing to rotate the boring bar 176 and spring reamer 140. The valve 170 is closed and bleed valve 174 is opened to depressurize the drilling machine 178. Drilling machine 178 is then disengaged from threaded adapter 168 and reamer adapter 156 is disengaged from boring bar 176. Other types of reamers and drill bits may be used with the Mueller E-5 drilling machine 178 to clear debris from within oil pipeline branch 172 prior to deployment of pipeline plug 10 within oil pipeline branch 172.

Oil pipeline branch 172 is sealed with pipeline plug 10 by first sliding the pipeline plug 10 into the oil pipeline branch 172. This is accomplished by attaching set tool 98 (FIG. 6A) to boring bar 176 with external threads 106 of set tool 98 engaging boring bar 176. The internal threads 40 (FIG. 2) of plug body 16 are then engaged with the external threads 118 of set tool 98, and plug body 16 is rotated with respect to set tool 98 to screw the pipeline plug 10 into engagement with set tool 98. If internal threads 40 of plug body 16 are left hand threaded, counter-clockwise rotation of plug body 16 (when viewing plug body 16 from the end with head 24) tightens the pipeline plug 10 on set tool 98. Slip assembly 14 is then rotated with respect to seal assembly 12 to move slip assembly 14 away from cone 22 into the position shown in FIG. 9B adjacent set tool 98. This ensures that the plurality of slips 66 will remain in the retracted position as the pipeline plug 10 slides into the oil pipeline branch 172.

The boring bar 176 and pipeline plug 10 are next retracted into the body 180 of the drilling machine 178, and the drilling machine 178 is engaged with the threaded adapter 168, as shown in FIG. 9D. Yoke 184 is engaged with the boring bar 176, bleed valve 174 is opened, and feed tube 182 is rotated, while rotation of boring bar 176 is restricted, until pipeline plug 10 makes contact with the closed valve 170 to be replaced. Bleed valve 174 is closed and valve 170 is opened. Feed tube 182 is rotated clockwise (when viewing the top of boring bar 176) to advance boring bar 176 and pipeline plug 10 down through valve 170 and into oil pipeline branch 172 to the position shown in FIG. 9E. The boring bar 176 and pipeline plug 10 are advanced a desired distance until pipeline plug 10 is positioned within oil pipeline branch 172. The distance may be measured and marked on body 180 prior to advancement of boring bar 176. Feed tube 182 is then rotated in the opposite direction to retract the boring bar 176 upward by approximately 0.75 inches. Boring bar 176 is then rotated counter-clockwise (when viewing the top of boring bar 176), which causes set tool 98 and plug body 16 to rotate with respect to set ring 60 advancing cone 22 toward the plurality of slips 66. As set tool 98 and plug body 16 rotate, plug body 16 moves from the disengaged position (FIG. 9B) to the engaged position (FIG. 3) and the serrated outer surface 76 of the plurality of slips 66 moves from the retracted position to the expanded position. As described above, serrated outer surface 76 preferably has an outer diameter that is slightly larger than the internal diameter of oil pipeline branch 172 such that the plurality of slips 66 exert a force on the internal surface of the oil pipeline branch 172 that prevents rotation of the plurality of slips 66 as plug body 16 is rotated. In the expanded position, the serrated outer surface 76 engages the internal surface of the oil pipeline branch 172 to prevent axial movement of the pipeline plug 10 within the oil pipeline branch 172. As the plug body 16 moves from the disengaged position to the engaged position, the outer diameter of seal 20 also expands to sealingly engage the internal surface of the oil pipeline branch 172 so that fluid cannot move past the pipeline plug 10. In this manner, pipeline plug 10 seals the oil pipeline branch 172.

Figure 9F:
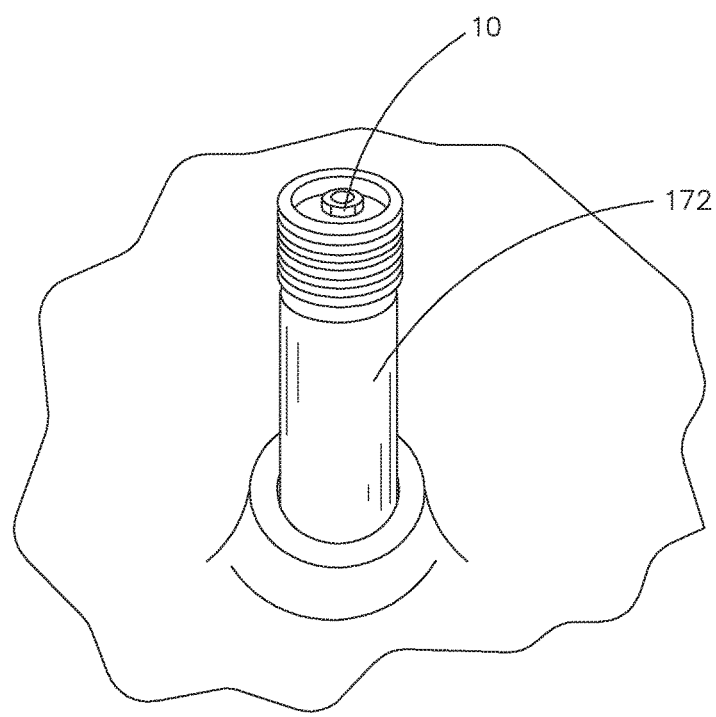
FIG. 9F is a perspective view of the oil pipeline branch with the pipeline plug of FIG. 1 positioned within the oil pipeline branch.

With pipeline plug 10 sealing the oil pipeline branch 172, valve 170 may be repaired or replaced. To replace valve 170, bleed valve 174 is first opened to relieve the pressure within drilling machine 178. Boring bar 176 is then rotated in a clockwise direction (when viewing the top of boring bar 176), which causes set tool 98 to disengage the internal threads 40 (FIG. 2) of plug body 16. While rotating boring bar 176, the yoke 184 and feed tube 182 (FIG. 9E) are simultaneously rotated in a counter-clockwise direction to move the boring bar 176 and set tool 98 upward with respect to pipeline plug 10. When set tool 98 and boring bar 176 are retracted into the body 180 of drilling machine 178, valve 170 is closed and drilling machine 178 is disengaged from the threaded adapter 168. Threaded adapter 168 may then be disengaged from valve 170, and valve 170 may be disengaged from oil pipeline branch 172 for repair or replacement. FIG. 9F shows oil pipeline branch 172 with valve 170 disengaged and removed. Pipeline plug 10 is positioned within and seals oil pipeline branch 172 to prevent the flow of fluid out of oil pipeline branch 172.

To put oil pipeline branch 172 back in service, valve 170 is repaired and rethreaded into engagement with oil pipeline branch 172, or a new valve 170 is threaded into engagement with oil pipeline branch 172. To remove the pipeline plug 10 from oil pipeline branch 172, valve 170 is closed and threaded adapter 168 is threaded into engagement with valve 170. Set tool 98 is disengaged from the boring bar 176 of drilling machine 178 and release tool 120 is threaded into engagement with the boring bar 176. The boring bar 176 and release tool 120 are then retracted into the body 180 of the drilling machine 178, and the drilling machine 178 is engaged with the threaded adapter 168, as shown in FIG. 9D. Valve 170 is opened. Yoke 184 is engaged with the boring bar 176, and feed tube 182 is rotated, while rotation of boring bar 176 is restricted, to advance the boring bar 176 and release tool 120 through valve 170 to the position shown in FIG. 9E until release tool 120 makes contact with plug body 16. Bleed valve 174 is closed. Boring bar 176 is rotated in a clockwise direction (when viewing the top of the boring bar 176) so that the internal threads 138 of release tool 120 engage the external threads 34 of plug body 16. As boring bar 176 is rotated, the release tool 120 moves downward toward the set ring 60. When release tool 120 engages set ring 60, further rotation of boring bar 176 and release tool 120 in the clockwise direction causes the plug body 16 to move from the engaged position (FIG. 3) to the disengaged position (FIG. 9B) and the serrated outer surface 76 of the plurality of slips 66 to move from the expanded position to the retracted position as spiral retaining ring 46 engages cone 22 to move cone 22 away from the plurality of slips 66. As the plug body 16 moves from the engaged position to the disengaged position, seal 20 contracts so that it no longer sealingly engages the internal wall of oil pipeline branch 172. This allows fluid to flow past pipeline plug 10 into the drilling machine 178. When serrated outer surface 76 moves to the retracted position, it no longer frictionally engages the internal wall of oil pipeline branch 172 so that pipeline plug 10 may be moved axially within oil pipeline branch 172.

To slide pipeline plug 10 out of the oil pipeline branch 172, feed tube 182 and yoke 184 are rotated in a counter-clockwise direction (when viewing the top of boring bar 176). This rotation moves the boring bar 176, release tool 120, and pipeline plug 10 upward through the oil pipeline branch 172, valve 170, and threaded adapter 168. Valve 170 is then closed, and bleed valve 174 is opened to release pressure from within drilling machine 178. Drilling machine 178 is then rotated to disengage it from threaded adapter 168, and threaded adapter 168 is disengaged from valve 170. The pipeline plug 10 may be disengaged from the release tool 120 and reused in future plugging operations. The pipeline plug 10 is not damaged during conventional use, which enables its reuse.

Other types of drilling machines besides the Mueller E-5 drilling machine 178 may be used to set pipeline plug 10 within a pipe. For instance, a T-101 drilling machine sold by T.D. Williamson may be used to set pipeline plug 10 within a pipe. The process for setting pipeline plug 10 with a T-101 drilling machine is similar to the process for setting pipeline plug 10 with a Mueller E-5 drilling machine; however, the set tool and release tool for use with the T-101 drilling machine are adapted for connection to the T-101 drilling machine and thus have a slightly different configuration than the set tool 98 and release tool 120 described above for use with the Mueller E-5 drilling machine 178.

The components of pipeline plug 10 may be sized for use with pipes of different dimensions, including, but not limited to, Schedule 80 pipes having internal diameters of approximately 0.75 inches, 1 inch, or 2 inches. Further, a particular size of pipeline plug 10 can be used to sealingly engage pipes within a range of internal diameters due to the variable expansion of seal 20 and the plurality of slips 66 as plug body 16 moves from the disengaged position to the engaged position when the seal 20 sealingly engages the internal wall of the pipe and the serrated outer surface 76 of the plurality of slips 66 engages the internal wall of the pipe to prevent axial movement of the pipeline plug 10 within the pipe. Pipeline plug 10 may also be used to sealingly engage a pipe having a varying internal diameter due to manufacturing inconsistencies and/or debris adhered to the internal wall of the pipe. The resilient nature of seal 20 and the grooves 72 separating portions of the serrated outer surface 76 allow pipeline plug 10 to seal a pipe having a varying internal diameter.

Pipeline plug 10 is preferably capable of sealing a pipe containing fluid at a pressure of 500 psi, and is most preferably capable of sealing a pipe containing fluid at a pressure of 5000 psi.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcom-

What is claimed and desired to be secured by Letters Patent is as follows:

1. A pipeline plug comprising:
 a seal assembly comprising a pressure engaging surface and a slip engaging surface; and
 a slip assembly coupled to the seal assembly, wherein the slip assembly comprises an outer surface that is movable from a retracted position to an expanded position, wherein the seal assembly is movable with respect to the slip assembly between an engaged position and a disengaged position, wherein the outer surface is in the retracted position when the seal assembly is in the disengaged position, wherein the slip engaging surface moves the outer surface to the expanded position when the seal assembly moves from the disengaged position to the engaged position, wherein a force exerted on the pressure engaging surface causes the slip engaging surface to exert a force on the slip assembly that opposes movement of the outer surface from the expanded position to the retracted position, and wherein when a force is exerted on the pressure engaging surface the seal assembly is movable from the engaged position to the disengaged position and the outer surface is movable from the expanded position to the retracted position, wherein at least a portion of the seal assembly rotates in a first direction as it moves from the disengaged position to the engaged position, wherein at least a portion of the seal assembly rotates in a second direction that is opposite to the first direction as it moves from the engaged position to the disengaged position, wherein one of the seal assembly and the slip assembly comprises a first set of threads and a second set of threads, wherein the other of the seal assembly and the slip assembly comprises a third set of threads, wherein the first set of threads engages the third set of threads, and wherein the second set of threads is threaded in an opposite direction as the first set of threads and the third set of threads.

2. The pipeline plug of claim 1, wherein the seal assembly comprises the first set of threads and the second set of threads, and wherein the slip assembly comprises the third set of threads.

3. The pipeline plug of claim 1, wherein the seal assembly comprises a plug body and a cone, wherein the plug body comprises the pressure engaging surface, and wherein the cone comprises the slip engaging surface.

4. The pipeline plug of claim 3, wherein the seal assembly comprises a seal that is positioned between the pressure engaging surface and the cone.

5. The pipeline plug of claim 4, wherein the seal comprises a fluoroelastomer.

6. The pipeline plug of claim 3, wherein the slip assembly comprises a plurality of slips, wherein the plurality of slips comprises the outer surface.

7. The pipeline plug of claim 6, wherein the slip assembly comprises a set ring that is coupled to the plurality of slips.

8. The pipeline plug of claim 7, wherein the first set of threads comprises external threads on the plug body, wherein the second set of threads comprises internal threads on the plug body, wherein the third set of threads comprises internal threads on the set ring, and wherein the external threads on the plug body engage the internal threads on the set ring.

9. The pipeline plug of claim 8, wherein the plug body rotates in a first direction as the seal assembly moves from the disengaged position to the engaged position, and wherein the plug body rotates in a second direction that is opposite to the first direction as the seal assembly moves from the engaged position to the disengaged position.

10. The pipeline plug of claim 9, wherein the plug body comprises a head and a shaft, wherein the head comprises the pressure engaging surface, wherein each of the cone, the plurality of slips, and the set ring presents an opening that receives the shaft, wherein the shaft comprises the external threads of the plug body, wherein the internal threads of the set ring surround the opening in the set ring, wherein the cone is positioned between the head and the set ring, wherein the cone comprises a tapered outer surface, a first end positioned nearest to the set ring, and a second end positioned nearest to the head, and wherein the tapered outer surface increases in diameter from the first end to the second end.

11. A pipeline plug comprising:
 a plug body comprising a head with a pressure engaging surface and a shaft coupled to the head, wherein the shaft comprises external threads and internal threads that are threaded in an opposite direction as the external threads;
 a set ring comprising internal threads that engage the external threads of the shaft;
 a plurality of slips that are coupled to the set ring, wherein the plurality of slips presents an opening that receives the shaft;
 a seal that is positioned between the head and the plurality of slips, wherein the seal presents an opening that receives the shaft; and
 a cone that is positioned between the seal and the set ring, wherein the cone comprises a slip engaging surface that engages the plurality of slips, and wherein the cone presents an opening that receives the shaft.

12. The pipeline plug of claim 11, wherein the plug body is movable between an engaged position and a disengaged position, wherein the plurality of slips comprises an outer surface that is movable between a retracted position and an expanded position, wherein the plug body rotates in a first direction with respect to the set ring as the plug body moves from the disengaged position to the engaged position, and wherein the plug body rotates in a second direction that is opposite to the first direction with respect to the set ring as the plug body moves from the engaged position to the disengaged position.

13. The pipeline plug of claim 12, wherein the outer surface of the plurality of slips is in the retracted position when the plug body is in the disengaged position, and wherein the slip engaging surface moves the outer surface to the expanded position when the plug body moves from the disengaged position to the engaged position.

14. The pipeline plug of claim 13, wherein a force exerted on the pressure engaging surface causes the slip engaging surface to exert a force on the plurality of slips that opposes movement of the outer surface from the expanded position to the retracted position.

15. The pipeline plug of claim 14, wherein when a force is exerted on the pressure engaging surface the plug body is movable from the engaged position to the disengaged position and the outer surface is movable from the expanded position to the retracted position.

16. The pipeline plug of claim 11, wherein the cone comprises a tapered outer surface, a first end positioned nearest to the set ring, and a second end positioned nearest to the head, and wherein the tapered outer surface increases in diameter from the first end to the second end.

17. A method of sealing a pipeline with a pipeline plug comprising a seal assembly comprising a pressure engaging surface, a first set of threads, a second set of threads, and a slip engaging surface, and a slip assembly comprising an outer surface, the method comprising:

sliding the pipeline plug into a pipe;

engaging the first set of threads on the seal assembly with a set tool;

rotating the set tool in a first direction to rotate at least a portion of the seal assembly in the first direction with respect to the slip assembly to move the seal assembly from a disengaged position to an engaged position, wherein movement of the seal assembly from the disengaged position to the engaged position causes the slip engaging surface to move the outer surface from a retracted position to an expanded position, in which the outer surface engages the pipe;

engaging the second set of threads on the seal assembly with a release tool;

rotating the release tool in a second direction that is opposite to the first direction to rotate at least a portion of the seal assembly in the second direction with respect to the slip assembly to move the seal assembly from the engaged position to the disengaged position, wherein movement of the seal assembly from the engaged position to the disengaged position allows the outer surface to move from the expanded position to the retracted position; and sliding the pipeline plug out of the pipe.

* * * * *